(12) United States Patent
Blott et al.

(10) Patent No.: US 10,320,918 B1
(45) Date of Patent: Jun. 11, 2019

(54) DATA-FLOW ARCHITECTURE FOR A TCP OFFLOAD ENGINE

(71) Applicant: Xilinx, Inc., San Jose, CA (US)

(72) Inventors: Michaela Blott, Dublin (IE); David A. Sidler, Bremgarten (SZ); Kimon Karras, Dublin (IE); Raymond Carley, Dublin (IE); Kornelis A. Vissers, Sunnyvale, CA (US)

(73) Assignee: XILINX, INC., San Jose, CA (US)

( * ) Notice: Subject to any disclaimer, the term of this patent is extended or adjusted under 35 U.S.C. 154(b) by 511 days.

(21) Appl. No.: 14/574,283

(22) Filed: Dec. 17, 2014

(51) Int. Cl.
  *G06F 15/16* (2006.01)
  *H04L 29/08* (2006.01)
  *H04L 12/741* (2013.01)

(52) U.S. Cl.
  CPC .......... *H04L 67/142* (2013.01); *H04L 45/74* (2013.01)

(58) Field of Classification Search
  CPC ....... H04L 69/16; H04L 69/163; H04L 49/90; H04L 47/193
  See application file for complete search history.

(56) References Cited

U.S. PATENT DOCUMENTS

| | | | | |
|---|---|---|---|---|
| 6,963,921 B1 * | 11/2005 | Yang | ................. | H04L 49/90 370/229 |
| 7,515,612 B1 * | 4/2009 | Thompson | ............... | H04L 69/16 370/474 |
| 7,539,760 B1 * | 5/2009 | Petry | ................. | G06F 15/16 709/220 |
| 7,620,057 B1 * | 11/2009 | Aloni | ................. | G06F 12/0804 370/395.7 |
| 7,647,436 B1 * | 1/2010 | Westrelin | ............... | G01R 31/08 370/235 |
| 7,814,218 B1 * | 10/2010 | Knee | ................. | H04L 69/18 709/230 |
| 7,826,470 B1 * | 11/2010 | Aloni | ................. | H04L 49/9063 370/419 |
| 8,005,916 B2 * | 8/2011 | Pope | ................. | G06F 13/10 709/212 |
| 8,166,175 B2 * | 4/2012 | Schmieder | ............. | H04L 69/32 709/217 |
| 8,346,919 B1 * | 1/2013 | Eiriksson | ................ | H04L 69/22 709/203 |
| 8,423,529 B1 * | 4/2013 | Bloomstein | ....... | G06F 17/30144 707/706 |

(Continued)

*Primary Examiner* — Shean Tokuta
(74) *Attorney, Agent, or Firm* — Robert M. Brush (57) ABSTRACT

In an example, an integrated circuit (IC) includes a receive circuit, a transmit circuit, and a control circuit. The receive circuit includes a receive data path and a receive control interface, the receive data path coupled to store received transmission control protocol (TCP) data for a plurality of TCP sessions in a respective plurality of receive buffers in an external memory circuit external to the IC. The transmit circuit includes a transmit data path and a transmit control interface, the transmit data path coupled to read TCP data to be transmitted for the plurality of TCP sessions from a respective plurality of transmit buffers in the external memory circuit. The control circuit is coupled to the receive control interface and the transmit control interface, the control circuit configured to maintain data structures to maintain TCP state information for the plurality of TCP sessions.

20 Claims, 6 Drawing Sheets

(56) References Cited

U.S. PATENT DOCUMENTS

| | | | | |
|---|---|---|---|---|
| 8,478,907 B1* | 7/2013 | Aloni | G06F 13/128 | 709/250 |
| 8,937,942 B1* | 1/2015 | Li | H04L 67/1097 | 370/386 |
| 9,088,592 B1* | 7/2015 | Craft | H04L 67/1097 | |
| 2004/0133713 A1* | 7/2004 | Elzur | H04L 47/193 | 710/52 |
| 2004/0250059 A1* | 12/2004 | Ramelson | H04L 63/0428 | 713/150 |
| 2005/0226238 A1* | 10/2005 | Hoskote | H04L 45/745 | 370/389 |
| 2005/0246450 A1* | 11/2005 | Enko | H04L 12/4675 | 709/230 |
| 2006/0007935 A1* | 1/2006 | Bennett | H04L 1/1841 | 370/395.5 |
| 2006/0067346 A1* | 3/2006 | Tucker | G06F 12/1081 | 370/412 |
| 2006/0181734 A1* | 8/2006 | Matsuura | H04L 49/90 | 358/1.15 |
| 2007/0014245 A1* | 1/2007 | Aloni | G06F 13/128 | 370/252 |
| 2007/0022212 A1* | 1/2007 | Fan | H04L 69/16 | 709/238 |
| 2007/0183418 A1* | 8/2007 | Riddoch | H04L 12/18 | 370/389 |
| 2007/0230489 A1* | 10/2007 | Cornett | H04L 47/10 | 370/412 |
| 2007/0255802 A1* | 11/2007 | Aloni | H04L 69/16 | 709/217 |
| 2007/0280111 A1* | 12/2007 | Lund | H04L 47/10 | 370/235 |
| 2008/0062879 A1* | 3/2008 | Sivakumar | H04L 29/1249 | 370/235 |
| 2008/0095182 A1* | 4/2008 | Elzur | H04L 47/193 | 370/412 |
| 2008/0126553 A1* | 5/2008 | Boucher | H04L 69/16 | 709/230 |
| 2008/0285945 A1* | 11/2008 | Rajakarunanayake | H04N 21/4325 | 386/235 |
| 2008/0304481 A1* | 12/2008 | Gurney | H04L 69/16 | 370/389 |
| 2009/0157896 A1* | 6/2009 | Kim | H04L 49/90 | 709/232 |
| 2009/0183057 A1* | 7/2009 | Aizman | H04L 69/16 | 714/807 |
| 2009/0254647 A1* | 10/2009 | Elzur | H04L 67/1097 | 709/223 |
| 2010/0131669 A1* | 5/2010 | Srinivas | G06F 9/5044 | 709/233 |
| 2011/0153935 A1* | 6/2011 | Li | H04L 45/00 | 711/118 |
| 2011/0185043 A1* | 7/2011 | Zeller | G06F 9/44521 | 709/219 |
| 2011/0206064 A1* | 8/2011 | Head | H04L 69/22 | 370/474 |
| 2012/0030687 A1* | 2/2012 | Bhandiwad | G06F 9/544 | 719/312 |
| 2012/0230208 A1* | 9/2012 | Pyatkovskiy | H04L 43/10 | 370/250 |
| 2014/0143315 A1* | 5/2014 | Kawazoe | H04L 67/06 | 709/203 |
| 2014/0310369 A1* | 10/2014 | Makhervaks | G06F 13/14 | 709/207 |
| 2015/0055661 A1* | 2/2015 | Boucher | G06F 5/10 | 370/421 |
| 2015/0089500 A1* | 3/2015 | Kompella | H04L 43/18 | 718/1 |

\* cited by examiner

DATA-FLOW ARCHITECTURE FOR A TCP OFFLOAD ENGINE

TECHNICAL FIELD

Examples of the present disclosure generally relate to integrated circuits and, in particular, to a data-flow architecture for a transmission control protocol (TCP) offload engine.

BACKGROUND

Transmission control protocol (TCP) is a core transmission layer protocol used in communication networks, such as the Internet. The core of TCP is defined in RFC 793, with additional features specified in other RFCs (e.g., RFC 5681 for TCP congestion control, RFC 2414 for increasing TCP's initial window, etc). TOP engines can be implemented in either software or hardware. Software implementations of TCP approach and solve challenges posed by TOP differently than hardware implementations. For example, software implementations operate on packets that have already been stored completely in memory (after being read by a network controller). In general, unlike hardware implementations of TCP, software implementations of TOP do not have to process packets of a TCP stream over successive clock cycles. Software implementations also take advantage of a large amount of available memory. Thus, software implementations of TCP can use data structures such as linked lists, which cannot be used in hardware implementations of TCP.

HW implementations of TOP, sometimes referred to TOP offload engines, can process TOP streams with low latency as compared to software implementations. A typical TCP offload engine employs ternary content address memories (TCAMs) for TCP session lookup. However, the use of TCAMs for TCP session lookup limits scalability of the TCP offload engine in terms of TCP session count.

SUMMARY

Techniques for providing a data-flow architecture for a transmission control protocol (TCP) offload engine are described. In an example, an integrated circuit (IC) includes a receive circuit, a transmit circuit, and a control circuit. The receive circuit includes a receive data path and a receive control interface, the receive data path coupled to store received transmission control protocol (TCP) data for a plurality of TCP sessions in a respective plurality of receive buffers in an external memory circuit external to the IC. The transmit circuit includes a transmit data path and a transmit control interface, the transmit data path coupled to read TCP data to be transmitted for the plurality of TCP sessions from a respective plurality of transmit buffers in the external memory circuit. The control circuit is coupled to the receive control interface and the transmit control interface, the control circuit configured to maintain data structures to maintain TCP state information for the plurality of TCP sessions.

In another example, an IC includes an Ethernet controller; an internet protocol (IP) controller, coupled to the Ethernet controller; at least one application circuit; and a transmission control protocol (TCP) offload engine, coupled between the IP controller and the at least one application circuit. The TCP offload engine includes: a receive circuit having a receive data path and a receive control interface, the receive data path coupled to store received TCP data for a plurality of TCP sessions in a respective plurality of receive buffers in an external memory circuit external to the IC; a transmit circuit having a transmit data path and a transmit control interface, the transmit data path coupled to read TCP data to be transmitted for the plurality of TCP sessions from a respective plurality of transmit buffers in the external memory circuit; and a control circuit coupled to the receive control interface and the transmit control interface, the control circuit configured to maintain data structures to maintain TCP state information for the plurality of TCP sessions.

In another example, a method of operating a transmission control protocol (TCP) offload engine in an integrated circuit includes: storing TCP data received on a receive data path for a plurality of TCP sessions in a respective plurality of receive buffers in an external memory circuit external to the IC; transmitting TCP data to be transmitted on a transmit data path for the plurality of TCP sessions from a respectively plurality of transmit buffers in the external memory circuit; and maintaining data structures to maintain TCP state information for the plurality of TCP sessions.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Techniques for providing a data-flow architecture for a transmission control protocol (TCP) offload engine are described. The TCP offload engine can support a large number of TCP sessions (e.g., 10,000 or more TCP sessions). The TCP offload engine also includes a hash implementation for TCP session lookup. The TCP offload engine also uses external memory for packet buffering and provides centralized data structures to track TCP state information that avoids access contention between transmit and receive paths. The TCP offload engine can be implemented in an integrated circuit (IC), such as a programmable IC (e.g., a field programmable gate array (FPGA)). These and further aspects of the present disclosure are discussed below.

Figure 1:
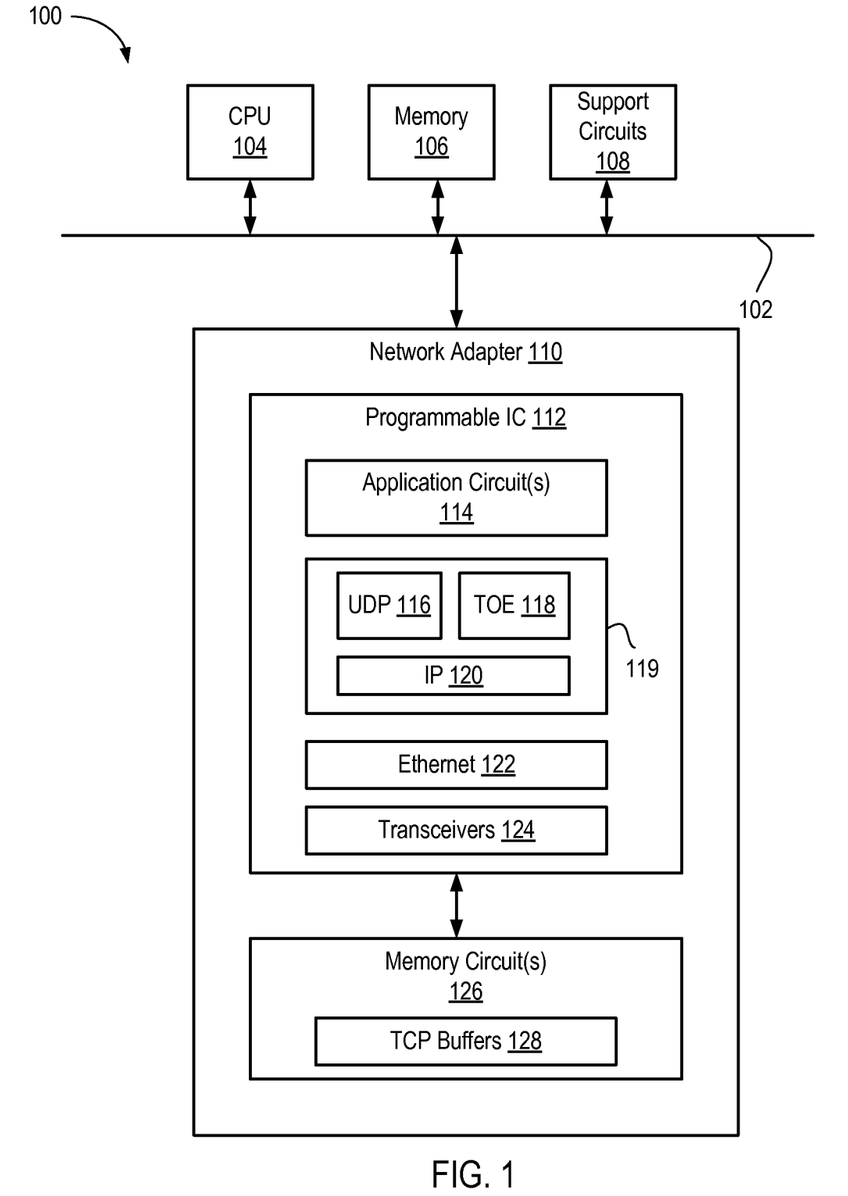
FIG. 1 is a block diagram depicting an example of a computer system.

FIG. 1 is a block diagram depicting an example of a computer system 100. The computer system 100 includes a central processing unit (CPU) 104, a memory 106, various support circuits 108, and a network adapter 110, each of which is coupled to a bus 102. The CPU 104 can include one or more microprocessors. The support circuits 108 can include conventional cache, power supplies, clock circuits, data registers, IO interfaces, and the like. The memory 106 may store all or portions of one or more programs for execution by the CPU 104. The memory 106 can also store data for use by components in the computer system 100, such as the CPU 104 and the network adapter 110. The memory 106 can include one or more of random access memory (RAM), read only memory (ROM), magnetic read/write memory, FLASH memory, solid state memory, or the like as well as combinations thereof. The network adapter 110 can be coupled to a network (not shown), which allows the computer system 100 to communicate with other computer systems on the network.

The network adapter 110 can include a programmable integrated circuit (IC) 112, such as a field programmable gate array (FPGA). The programmable IC 112 can be coupled to one or more memory circuits (memory circuit(s) 126). The programmable IC 112 can include various dedicated circuits (e.g., hard circuits) and/or configured circuits (e.g., circuits formed from programmable logic) to perform data processing at various layers using various protocols. In the example shown, the programmable IC 112 can include physical layer circuits, such as transceivers 124 capable of sending and receiving data streams. The programmable IC 112 can include data link layer circuits, such as an Ethernet controller 122. The programmable IC 112 can include a network layer circuit 119, which can include an internet protocol (IP) engine 120, a uniform datagram protocol (UDP) engine 116, and a transmission control protocol (TCP) offload engine (TOE) 118. An example of a TOE that can be used as the TOE 118 is described below. The programmable IC 112 can also include various application layer circuit(s) 114. The programmable IC 112 can also use the memory circuit(s) 126. For example, as described below, the TOE 118 can establish TCP buffers 128 in the memory circuit(s) 126.

Examples described herein include an IC, such as a programmable IC, having a TCP offload engine therein. While the programmable IC 112 is shown as having various components to process data, it is to be understood that some components may be external to the programmable IC 112. For example, the Ethernet controller 122 can be external to the programmable IC 112 on the network adapter 110. In another example, some or all of the application layer circuit(s) 114 can be external to the programmable IC 112 on the network adapter 110. While a network adapter 110 has been described, in other examples, the TOE 118 can be implemented in other devices, such as a separate accelerator or other type of separate circuit that interfaces with a network adapter.

Figure 2:
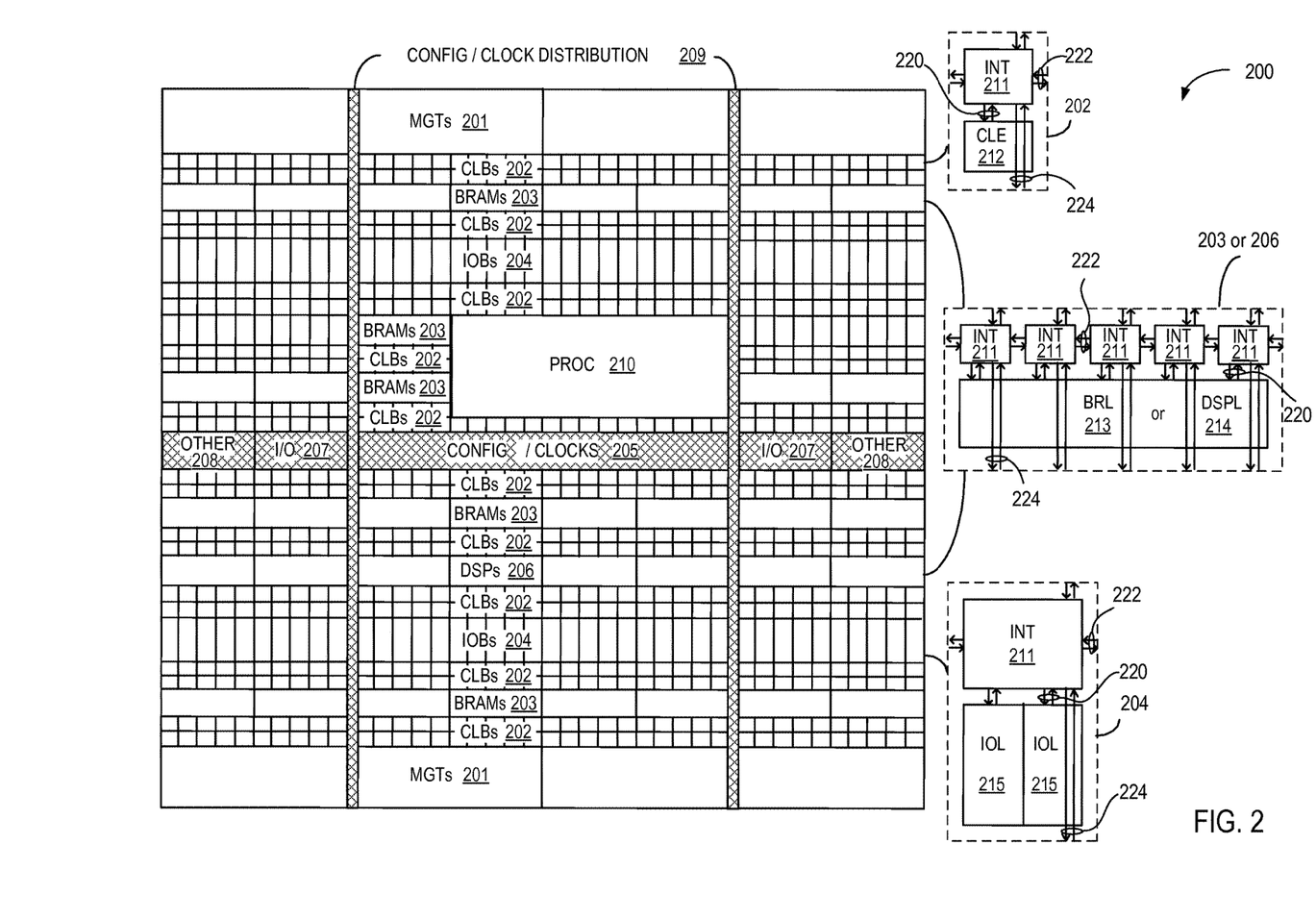
FIG. 2 illustrates an example of a field programmable gate array (FPGA).

FIG. 2 illustrates an example of a field programmable gate array (FPGA) 200. The FPGA 200 can be used as the programmable IC 112 of the network adapter 110. The FPGA 200 includes a programmable fabric that includes a large number of different programmable tiles including multi-gigabit transceivers ("MGTs") 201, configurable logic blocks ("CLBs") 202, random access memory blocks ("BRAMs") 203, input/output blocks ("IOBs") 204, configuration and clocking logic ("CONFIG/CLOCKS") 205, digital signal processing blocks ("DSPs") 206, specialized input/output blocks ("I/O") 207 (e.g., configuration ports and clock ports), and other programmable logic 208 such as digital clock managers, analog-to-digital converters, system monitoring logic, and so forth. Some FPGAs also include dedicated processor blocks ("PROC") 210.

In some FPGAs, each programmable tile can include at least one programmable interconnect element ("INT") 211 having connections to input and output terminals 220 of a programmable logic element within the same tile, as shown by examples included at the top of FIG. 2. Each programmable interconnect element 211 can also include connections to interconnect segments 222 of adjacent programmable interconnect element(s) in the same tile or other tile(s). Each programmable interconnect element 211 can also include connections to interconnect segments 224 of general routing resources between logic blocks (not shown). The general routing resources can include routing channels between logic blocks (not shown) comprising tracks of interconnect segments (e.g., interconnect segments 224) and switch blocks (not shown) for connecting interconnect segments. The interconnect segments of the general routing resources (e.g., interconnect segments 224) can span one or more logic blocks. The programmable interconnect elements 211 taken together with the general routing resources implement a programmable interconnect structure ("programmable interconnect") for the illustrated FPGA. Each programmable interconnect element 211 can include an interconnect circuit that can implement various types of switching among input interconnect segments and output interconnect segments, such as cross-point switching, breakpoint switching, multiplexed switching, and the like.

In an example, a CLB 202 can include a configurable logic element ("CLE") 212 that can be programmed to implement user logic plus a single programmable interconnect element ("INT") 211. A BRAM 203 can include a BRAM logic element ("BRL") 213 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 206 can include a DSP logic element ("DSPL") 214 in addition to an appropriate number of programmable interconnect elements. An IOB 204 can include, for example, two instances of an input/output logic element ("IOL") 215 in addition to one instance of the programmable interconnect element 211. As will be clear to those of skill in the art, the actual I/O pads connected, for example, to the I/O logic element 215 typically are not confined to the area of the input/output logic element 215.

In the pictured example, a horizontal area near the center of the die (shown in FIG. 2) is used for configuration, clock, and other control logic. Vertical columns 209 extending from this horizontal area or column are used to distribute the clocks and configuration signals across the breadth of the FPGA.

Some FPGAs utilizing the architecture illustrated in FIG. 2 include additional logic blocks that disrupt the regular columnar structure making up a large part of the FPGA. The additional logic blocks can be programmable blocks and/or dedicated logic. For example, processor block 210 spans several columns of CLBs and BRAMs. The processor block 210 can various components ranging from a single microprocessor to a complete programmable processing system of microprocessor(s), memory controllers, peripherals, and the like.

Note that FIG. 2 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 2 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

Figure 3:
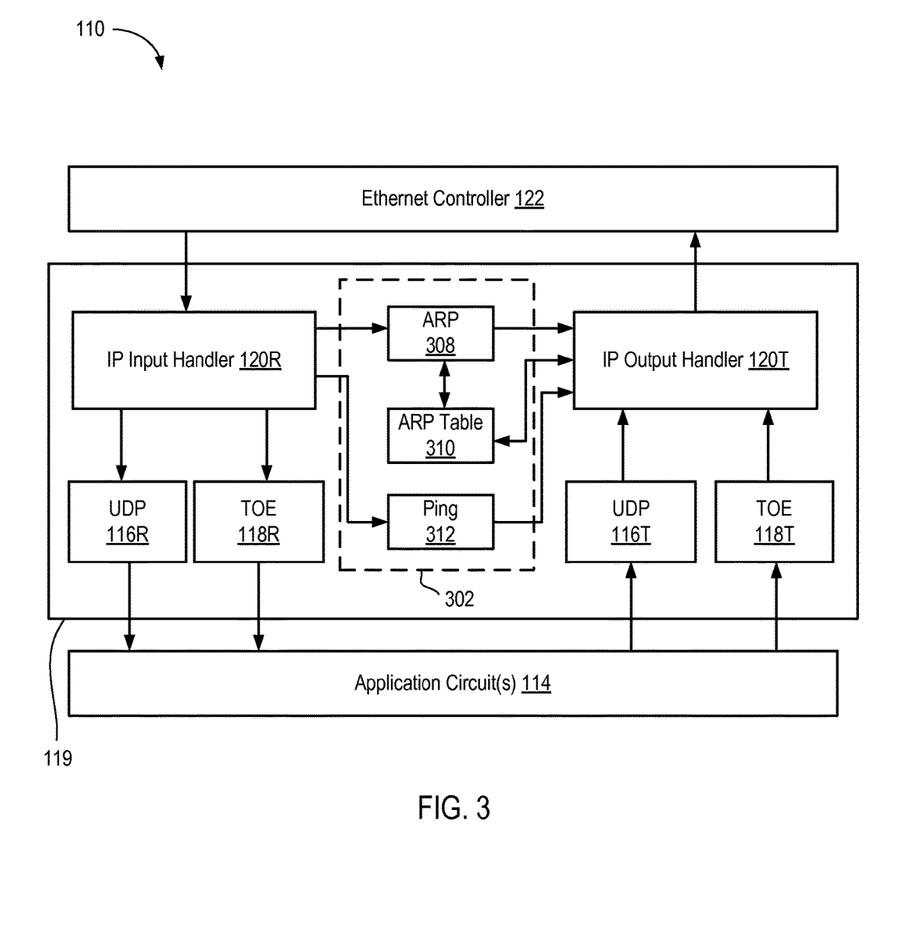
FIG. 3 is a block diagram showing an example of the data flow in a network adapter.

FIG. 3 is a block diagram showing an example of the data flow in the network adapter 110. The IP engine 120 includes an IP input handler 120R and an IP output hander 120T. Likewise, the UDP engine 116 includes a UDP receive engine 116R and a UDP transmit engine 116T. The TOE 118 includes a TCP receive engine 118R and a TCP transmit engine 118T. The network layer circuit 119 can include other components 302, such as an address resolution protocol (ARP) engine 308, an ARP table 310, and a ping handler 312. Control logic of the TOE 118 is omitted from FIG. 3 for clarity, but is described in detail below with respect to FIG. 4.

In the receive path, the IP input handler 120R receives input from the Ethernet controller 122. The IP input handler 120R provides UDP streams to the UDP receive engine 116R and TCP streams to the TCP receive engine 118R. The UDP receive engine 116R and the TCP receive engine 118R provide received data to the application circuit(s) 114. In the transmit path, the application circuit(s) 114 provide data to the UDP transmit engine 116T and the TCP transmit engine 118T. The UDP transmit engine 116T provides UDP streams to the IP output handler 120T. The TCP transmit engine 118T provides TCP streams to the IP output handler 120T. The IP output hander 120T provides output to the Ethernet controller 122. The ARP engine 308 uses the ARP protocol to resolve IP addresses into link layer addresses (e.g., media access control (MAC) addresses). The ARP engine 308 stores relations between IP addresses and MAC addresses in the ARP table 310. The ping handler 312 can be used to respond to ping requests or the like (e.g., messages comporting with the internet control message protocol (ICMP)).

Figure 4:
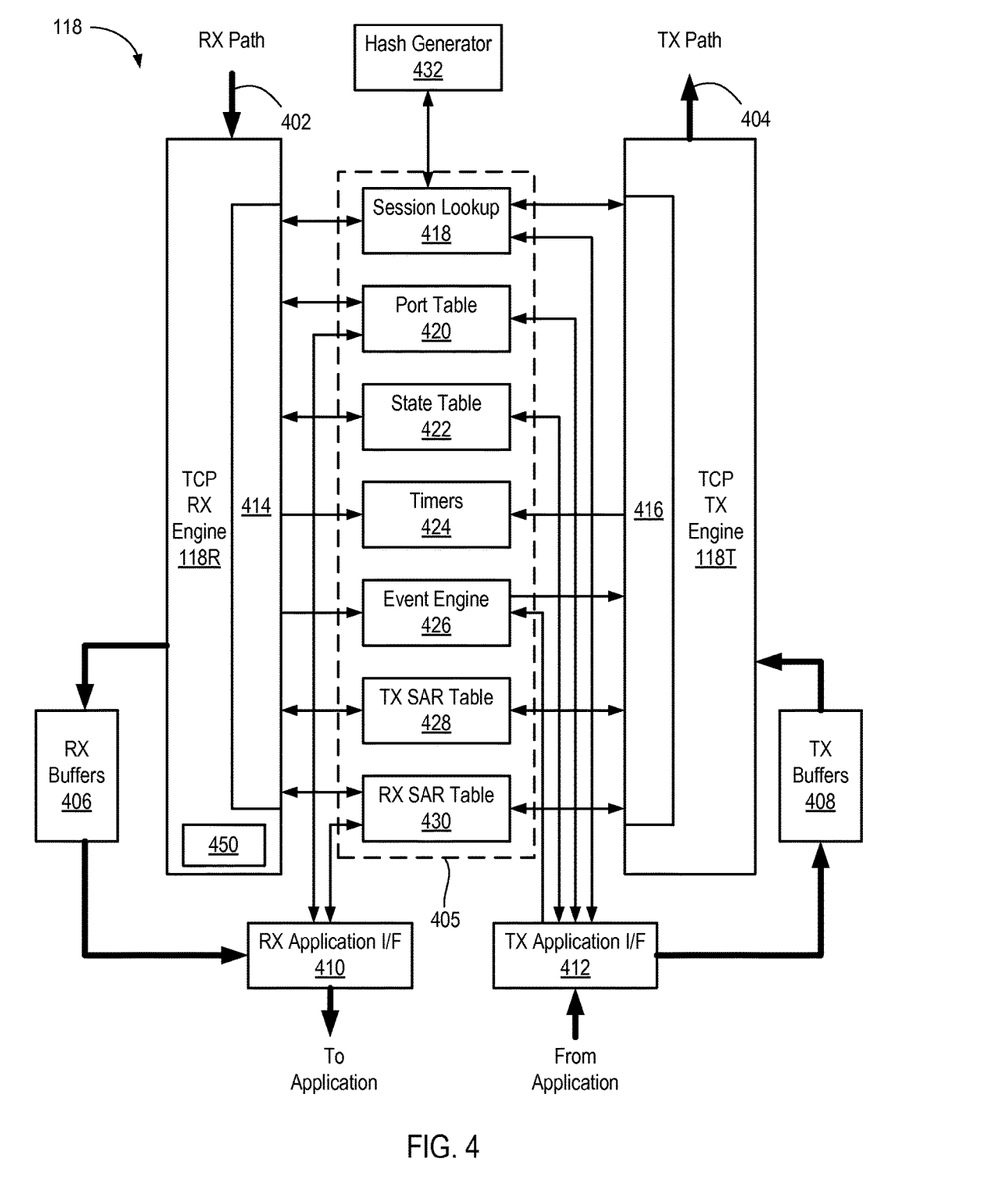
FIG. 4 is a block diagram showing an example of a TCP offload engine.

FIG. 4 is a block diagram showing an example of the TOE 118. The TOE 118 comprises the TCP receive engine 118R (also referred to as the TCP RX engine 118R) and the TCP transmit engine 118T (also referred to as the TCP TX engine 118T). The TCP receive engine 118R includes a receive path interface 402 for receiving TCP data. The TCP data can include data for a plurality of different TCP sessions. A TCP session is a connection between a source IP address/source port and a destination IP address/destination port. The TCP receive engine 118R creates a receive buffer in external memory for each TCP session. Thus, the TCP receive engine 118R stores the TCP data in RX buffers 406. The RX buffers 406 can be part of the TCP buffers 128 in the memory circuit(s) 126 (FIG. 1). The TOE 118 includes a receive application interface (RX application IF 410) that provides an interface between the TOE 118 and an application (e.g., an application circuit 114). The RX application IF 410 can obtain TCP data from the RX buffers 406 and provide the TCP data to the application. For example, the application can notify the RX application IF 410 to listen on a particular TCP port (e.g., open a particular TCP port). When valid TCP data is received on the TCP port and stored in the RX buffers 406, the RX application IF 410 can notify the application that TCP data is available. The application can obtain the TCP data from the RX application IF 410.

On the transmit side, the TOE 118 includes a transmit application interface (TX application IF 412) that provides an interface between the TOE 118 and an application (e.g., an application circuit 114). The TX application IF 410 can obtain data from the application that is to be transmitted as TCP data. For example, the application can notify the TX application IF 410 that a TCP session to a remote host is to be established. The TX application IF 410 can notify the application of the success or failure of creating the requested TCP session. If successful, the TX application IF 410 can provide a TCP session identifier (ID) (described below) to the application. The application can then provide the data to be transmitted over the TCP session. The TX application IF 410 can then store the data to be transmitted in TX buffers 408. The TX buffers 408 can be part of the TCP buffers 128 in the memory circuit(s) 126 (FIG. 1). The TCP transmit engine 118T can obtain the data to be transmitted from the TX buffers 408. The TCP transmit engine 118T includes a transmit path interface 404. The TCP transmit engine 118T transmits the TCP data over the transmit path interface 404.

The TOE 118 includes a control circuit 405. The TCP receive engine 118R includes a receive control interface 414 coupled to the control circuit 405. The TCP transmit engine 118T includes a transmit control interface 416 coupled to the control circuit 405. The control circuit 405 is configured to maintain data structures and associated logic to maintain TCP state information for the current TCP sessions. For example, the control circuit 405 can include a memory circuit configured to store the data structures. In the example shown, the control circuit 405 includes a session lookup 418, a port table 420, a state table 422, timers 424, an event engine 426, a transmit segmentation and reassembly (TX SAR) table 428, and a receive segmentation and reassembly (RX SAR) table 430.

The session lookup 418 manages TCP session IDs. TCP packets do not include a session identifier. The session lookup 418 can cooperate with a hash generator 432 to generate TCP session IDs from attributes in the TCP data that are associated with a TCP session. For example, the session lookup 418 can provide a source IP, source port, destination IP, and destination port tuple to the hash generator 432. The hash generator can generate a hash of the tuple and provide the hash as a TCP session ID. In this manner, the session lookup 418 can have a TCP session ID generated for each TCP session and can store the active TCP session IDs in a table. The hash generator 432 can be a hard circuit or a configured circuit in the programmable IC 112. This implementation of generating TCP session IDs is scalable and saves considerable resources as compared to TCAM implementations. Both the TCP receive engine 118R and the TCP transmit engine 118T can access the session lookup 418 to obtain TCP session IDs. The TX application IF 412 can also access the session lookup 418 to obtain TCP session IDs in response to requests from the application.

The port table 420 contains an entry for each TCP port. Each entry can include various information for the TCP port, such as whether the TCP port is currently open or closed. Both the TCP receive engine 118R and the TCP transmit engine 118T can access the port table 420. The RX application IF 410 can also access the port table 420 in response to requests to open a port from the application.

The state table 422 contains an entry per TCP session. Each entry includes the current state of the TCP session. The TCP receive engine 118R can access the state table 422. The TX application IF 412 can also access the state table 422 in response to requests from the application.

The timers 424 include one or more timer circuits that can be used to monitor TCP sessions. For example, the timers 424 can be used to determine if packets are to be retransmitted of if a TCP session should be closed due to expiration of a time out period. Both the TCP receive engine 118R and the TCP transmit engine 118T can access the timers 424.

The event engine 426 implements a switch matrix that routes events between the TCP RX engine 118R and the TCP TX engine 118T. For example, when a packet is received by the TCP RX engine 118R, the TCP RX engine 118R generates an event that is received by the event engine 426, which passes the event to the TCP TX engine 118T. The event engine 426 can handle various events generated by the TCP RX engine 118R and/or the TCP TX engine 118T.

The TX SAR table 428 and the RX SAR table 430 include pointers that allow the respective TCP transmit engine 118T and the TCP receive engine 118R to keep track of TCP data in the respective TX buffers 408 and the RX buffers 406. Both the TCP receive engine 118R and the TCP transmit engine 118T can access each of the TX SAR table 428 and the RX SAR table 430. As described below, the TX SAR table 428 and the RX SAR table 430 can include points to valid TCP data, as well as pointers to out-of-order (OOO) TCP segments.

The configuration of the control circuit 405 shown in FIG. 4 is just one example. In other examples, the some of the tables can be merged into a single table that provides a combined functionality (e.g., the port table 420 and the state table 422 can be merged to provide table that tracks both ports and states).

The architecture of the TOE 118 described above decouples the RX and TX data paths from the state tables, which results in high scalability in terms of TCP session count. TCP session count can be increased as desired by resizing only the state tables in the control circuit 405. The TCP receive engine 118R and the TCP transmit engine 118T does not need to be modified in order to increase TCP session count. The data-flow architecture of the TOE 118, combined with the hash table implementation of TCP session IDs and with the RX and TX buffers in external memory, achieves support for a large number of TCP sessions at high throughput (e.g., 10 Gbps or more). The TOE 118 can be implemented in an integrated circuit, such as a programmable IC (e.g., either as a hard circuit or configured in programmable logic or a combination thereof).

Figure 5:
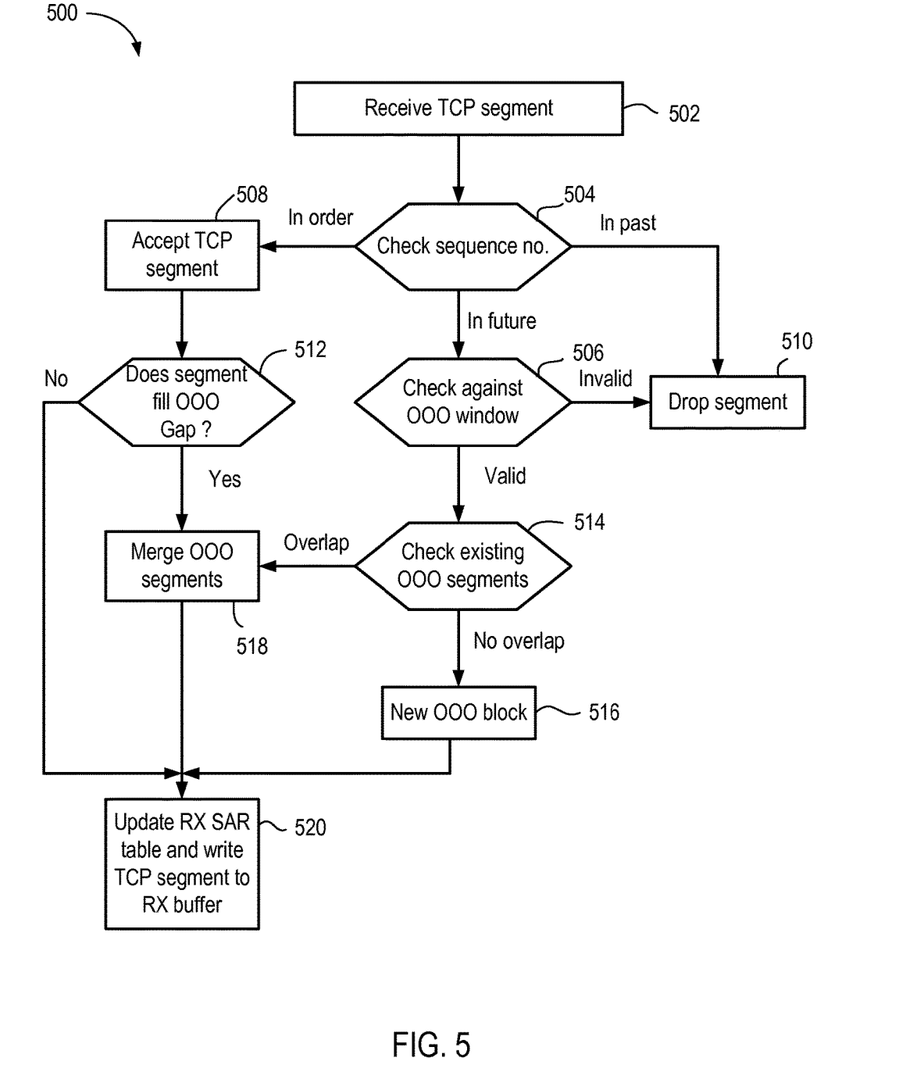
FIG. 5 is a flow diagram depicting an example of a method of out-of-order (OOO) TCP segment handling.

FIG. 5 is a flow diagram depicting an example of a method 500 of out-of-order (OOO) TCP segment handling. The TOE 118 can include an OOO TCP segment handler 450 to perform the method 500 to handle TCP segments that are received out-of-order. The method 500 begins at step 502, where the TCP receive engine 118R receives a TCP segment. At step 504, the TCP receive engine 118R checks the sequence number in the TCP segment. The RX buffer 306 for the given TCP segment stores valid TCP data and OOO TCP segments. Valid TCP data includes TCP data that has been received and acknowledged. If the sequence number is in the past (e.g., the TCP segment was transmitted prior to the received and acknowledged TCP data), the method 500 proceeds to step 510. At step 510, the TCP segment is dropped. A TCP segment transmitted prior to the received and acknowledged TCP data does not contain useful data.

If the sequence number indicates the TCP segment is received in order, the method 500 proceeds to step 508. At step 508, the TCP receive engine 118R accepts the TCP segment. At step 512, the TCP receive engine 118R determines whether the TCP segment fills an OOO gap (e.g., a gap between TCP segments). If not, the method 500 proceeds to step 520, where the TCP segment is stored in the RX buffer 406 and the RX SAR table 330 is updated. If the TCP segment fills an OOO gap at step 512, the method 500 proceeds to step 518. At step 518, the OOO TCP segments are merged in response to a gap having been filled. The method 500 proceeds to step 520.

If at step 504 the sequence number indicates the TCP segment was transmitted after the valid TCP data (e.g., a future TCP segment, but out-of-order), the method 500 proceeds to step 506. At step 506, the TCP receive engine 118R checks the TCP segment against the current OOO window. The TOE 118 can be configured to handle a particular window of OOO TCP segments. If the TCP segment falls outside of the window, the method 500 proceeds to step 510, where the TCP segment is dropped. If the TCP segment is within the OOO window, the method 500 proceeds to step 514.

At step 514, the TCP receive engine 118R checks the existing OOO TCP segments to determine if the current TCP segment overlaps. If not, the method 500 proceeds to step 516, where the current TCP segment is indicated as a new TCP segment to be stored. The method 500 proceeds to step 520. If at step 514 the current TCP segment overlaps the existing OOO segments, the method 500 proceeds to step 518, where the current TCP segment is merged with the overlapping OOO segments.

Figure 6:
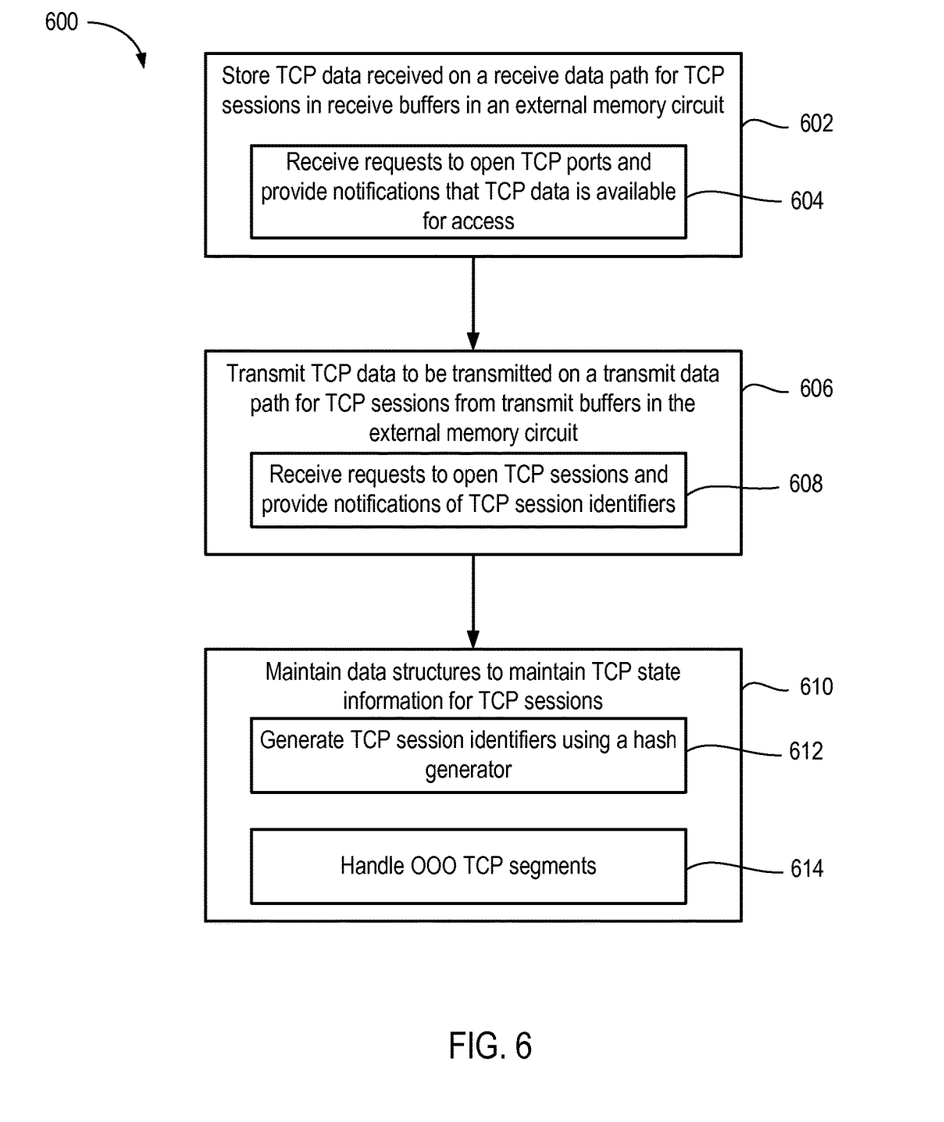
FIG. 6 is a block diagram depicting an example method of operating a TCP offload engine in an IC.

FIG. 6 is a block diagram depicting an example method 600 of operating a TCP offload engine in an IC. The method 600 can be performed by the TOE 118. The method 600 begins at step 602, where the TOE 118 stores TCP data received on a receive data path for TCP sessions in receive buffers in an external memory circuit. In an example, step 602 includes at step 604, where the TOE 118 receives requests to open TCP ports and provides notifications that TCP data is available for access. At step 608, the TOE 118 transmits TCP data to be transmitted on a transmit data path for TCP sessions from transmit buffers in the external memory circuit. In an example, the step 606 includes a step 608, where the TOE 118 receives requests to open TCP sessions and provides notifications of the TCP session identifiers. At step 610, the TOE 118 maintains data structures to maintain TCP state information for TCP sessions. In an example, the step 610 includes a step 612 and a step 614. At step 612, the TOE 118 generates TCP session identifiers using a hash generator. At step 614, the TOE 118 handles OOO TCP segments. For example, the TOE 118 can perform the method 500 of FIG. 5 described above.

While the foregoing is directed to specific examples, other and further examples may be devised without departing from the basic scope thereof, and the scope thereof is determined by the claims that follow.

What is claimed is:

1. An integrated circuit (IC), comprising:
   a receive circuit having a receive data path and a receive control interface, the receive data path coupled to store received transmission control protocol (TCP) data for a plurality of TCP sessions in a respective plurality of receive buffers in an external memory circuit external to the IC;
   a transmit circuit having a transmit data path and a transmit control interface, the transmit data path coupled to read TCP data to be transmitted for the plurality of TCP sessions from a respective plurality of transmit buffers in the external memory circuit;
   a receive application interface coupled between the receive buffers in the external memory and an application circuit;
   a transmit application interface coupled between the application circuit and the transmit buffers in the external memory; and a control circuit coupled to the receive control interface and the transmit control interface and decoupled from the receive data path and the transmit data path, the control circuit configured to maintain data structures to maintain TCP state information for the plurality of TCP sessions.

2. The IC of claim 1, further comprising:
a hash generator;
wherein the data structures include a TCP session lookup table having session identifiers for the plurality of sessions, each of the session identifiers being a hash generated by the hash generator in response to a source internet protocol (IP) address, a destination IP address, a source port, and a destination port.

3. The IC of claim 1, wherein the data structures include a transmit segmentation and reassembly (SAR) table for the transmit circuit and a receive SAR table for the receive circuit, the transmit SAR table including pointers to locations in the plurality of transmit buffers and the receive SAR table including pointers to locations in the plurality of receive buffers.

4. The IC of claim 3, wherein the receive circuit includes an out-out-order (OOO) TCP segment handler, and wherein the receive SAR table includes a pointer to valid data and at least one pointer to at least one OOO TCP segment for each of the plurality of receive buffers.

5. The IC of claim 1, wherein:
the receive application interface is configured to receive requests to open a TCP port and to provide notifications that TCP data is available for access.

6. The IC of claim 1, wherein:
the transmit application interface is configured to receive requests to open a TCP session and provide notifications of a TCP session identifier.

7. An integrated circuit (IC), comprising:
an Ethernet controller;
an internet protocol (IP) controller, coupled to the Ethernet controller; and
a transmission control protocol (TCP) offload engine, coupled to the IP controller, the TCP offload engine including:
a receive circuit having a receive data path and a receive control interface, the receive data path coupled to store received TCP data for a plurality of TCP sessions in a respective plurality of receive buffers in an external memory circuit external to the IC;
a transmit circuit having a transmit data path and a transmit control interface, the transmit data path coupled to read TCP data to be transmitted for the plurality of TCP sessions from a respective plurality of transmit buffers in the external memory circuit;
a receive application interface coupled between the receive buffers in the external memory and an application circuit;
a transmit application interface coupled between the application circuit and the transmit buffers in the external memory; and
a control circuit coupled to the receive control interface and the transmit control interface and decoupled from the receive data path and the transmit data path, the control circuit configured to maintain data structures to maintain TCP state information for the plurality of TCP sessions.

8. The IC of claim 7, further comprising:
a hash generator;
wherein the data structures include a TCP session lookup table having session identifiers for the plurality of sessions, each of the session identifiers being a hash generated by the hash generator in response to a source IP address, a destination IP address, a source port, and a destination port.

9. The IC of claim 7, wherein the data structures include a transmit segmentation and reassembly (SAR) table for the transmit circuit and a receive SAR table for the receive circuit, the transmit SAR table including pointers to locations in the plurality of transmit buffers and the receive SAR table including pointers to locations in the plurality of receive buffers.

10. The IC of claim 9, wherein the receive circuit includes an out-out-order (OOO) TCP segment handler, and wherein the receive SAR table includes a pointer to valid data and at least one pointer to at least one OOO TCP segment for each of the plurality of receive buffers.

11. The IC of claim 7, wherein:
the receive application interface is configured to receive requests to open a TCP port and to provide notifications that TCP data is available for access.

12. The IC of claim 7, wherein:
the transmit application interface is configured to receive requests to open a TCP session and provide notifications of a TCP session identifier.

13. The IC of claim 7, further comprising at least one application circuit coupled to the TCP offload engine.

14. The IC of claim 7, further comprising an address resolution protocol (ARP) handler, an ARP table, and a ping handler coupled to the IP controller.

15. A method of operating a transmission control protocol (TCP) offload engine in an integrated circuit (IC), the method comprising:
storing TCP data received from an application circuit through a receive application interface on a receive data path for a plurality of TCP sessions in a respective plurality of receive buffers in an external memory circuit external to the IC;
transmitting TCP data to be transmitted from the application circuit through a transmit application interface on a transmit data path for the plurality of TCP sessions from a respectively plurality of transmit buffers in the external memory circuit; and
maintaining data structures to maintain TCP state information for the plurality of TCP sessions in a control circuit that is decoupled from the receive data path and the transmit data path.

16. The method of claim 15, further comprising:
generating a TCP session identifier by computing a hash of a tuple comprising a source internet protocol (IP) address, a source port, a destination IP address, and a destination port.

17. The method of claim 15, wherein the data structures include a transmit segmentation and reassembly (SAR) table for the transmit circuit and a receive SAR table for the receive circuit, the transmit SAR table including pointers to locations in the plurality of transmit buffers and the receive SAR table including pointers to locations in the plurality of receive buffers.

18. The method of claim 17, further comprising:
handling out-of-order TCP segments;
wherein the receive SAR table includes a pointer to valid data and at least one pointer to at least one OOO TCP segment for each of the plurality of receive buffers.

19. The method of claim 15, further comprising:
receiving requests to open a TCP port; and providing notifications that TCP data is available for access.

20. The method of claim 15, further comprising:
receiving requests to open a TCP session; and
providing notifications of a TCP session identifier.

* * * * *